US009760447B2

(12) United States Patent
Durge et al.

(10) Patent No.: US 9,760,447 B2
(45) Date of Patent: Sep. 12, 2017

(54) ONE-CLICK BACKUP IN A CLOUD-BASED DISASTER RECOVERY SYSTEM

(71) Applicants: Sachin Baban Durge, Pune (IN); Kuldeep Sureshrao Nagarkar, Pune (IN); Ravender Goyal, Saratoga, CA (US); Ashish Govind Khurange, Pune (IN); Trimbak Somnathappe Bardale, Pune (IN); Kulangara Kuriakose George, Pune (IN)

(72) Inventors: Sachin Baban Durge, Pune (IN); Kuldeep Sureshrao Nagarkar, Pune (IN); Ravender Goyal, Saratoga, CA (US); Ashish Govind Khurange, Pune (IN); Trimbak Somnathappe Bardale, Pune (IN); Kulangara Kuriakose George, Pune (IN)

(*) Notice: Subject to any disclaimer, the term of this patent is extended or adjusted under 35 U.S.C. 154(b) by 369 days.

(21) Appl. No.: 14/335,295

(22) Filed: Jul. 18, 2014

(65) Prior Publication Data
US 2015/0331757 A1 Nov. 19, 2015

Related U.S. Application Data

(63) Continuation-in-part of application No. 14/280,686, filed on May 19, 2014, now Pat. No. 9,558,076.

(51) Int. Cl.
*G06F 17/30* (2006.01)
*G06F 11/14* (2006.01)
*G06F 9/455* (2006.01)

(52) U.S. Cl.
CPC ...... *G06F 11/1458* (2013.01); *G06F 9/45558* (2013.01); *G06F 11/1451* (2013.01); *G06F 11/1453* (2013.01); *G06F 17/30088* (2013.01); *G06F 17/30156* (2013.01); *G06F 17/30203* (2013.01); *G06F 17/30575* (2013.01); *G06F 2009/45583* (2013.01); *G06F 2201/80* (2013.01); *G06F 2201/815* (2013.01)

(58) Field of Classification Search
None
See application file for complete search history.

(56) References Cited

U.S. PATENT DOCUMENTS

2010/0138827 A1* 6/2010 Frank .................. G06F 9/45558
718/1
2011/0196842 A1* 8/2011 Timashev ........... G06F 11/1469
707/679

(Continued)

OTHER PUBLICATIONS

Ricci et al.,"Securing the Frisbee multicast disk loader",2008,AMC Digital Library,CSET'08 Proceedings of the conference on Cyber security experimentation and test Article No. 3, pp. 1-10.*

*Primary Examiner* — Alexander Khong

(57) ABSTRACT

In one embodiment, a computer-implemented method includes the step of accessing a set of data blocks in a local application server disk in an application server. It is determined which of the set of data blocks are used to store data. The data blocks used to store data are read to a deduplication store on the storage appliance. It is determined that a modification occurs to a data block in the local application server disk of the application server. The modification is read to the deduplication store. A remote virtual image of the application server can be generated from the deduplication store.

4 Claims, 5 Drawing Sheets

(56) References Cited

U.S. PATENT DOCUMENTS

2013/0151802 A1\* 6/2013 Bahadure .............. G06F 3/0605
  711/162
2015/0074659 A1\* 3/2015 Madsen .................... G06F 8/61
  717/177
2015/0095597 A1\* 4/2015 Ayanam .................. G06F 3/065
  711/162

\* cited by examiner

ONE-CLICK BACKUP IN A CLOUD-BASED DISASTER RECOVERY SYSTEM

CROSS-REFERENCE TO RELATED APPLICATIONS

This application is a continuation-in-part of and claims priority to U.S. patent application Ser. No. 14/280,686, titled METHODS AND SYSTEMS OF CLOUD-BASED DISASTER RECOVERY, filed on 19 May 2014. U.S. patent application Ser. No. 14/280,686 application is incorporated herein by reference.

BACKGROUND

1. Field

This application relates generally to data storage, and more specifically to a system, article of manufacture and method for one-click backup in a cloud-based disaster recovery system.

2. Related Art

Several problems with current disaster recovery (DR) solutions cost and complexity may provide various problems. For example, high availability DR with aggressive recovery point objectives (RPO) and recovery time objectives (RTO) have traditionally only been achievable in large enterprises with multiple datacenters at high capital and operational costs. Often, multiple solutions, such as data replication and failover technologies are used that further increase the complexity and cost of a robust DR deployment. Additionally, many DR solution can be overly cumbersome. For example, tape backup scenarios can use tape storage device that have reliability and/or technical problems. Meanwhile, more cost effective approaches lead to lower service levels with compromises in RPO and/or RIO objectives. For example, shipping backup tapes off-site to a coldsite can requires a time-consuming purchase to rebuild of physical servers in the case of a disaster.

BRIEF SUMMARY OF THE INVENTION

In one aspect, a method includes the step of accessing a set of data blocks in a local application server disk in an application server. It is determined which of the set of data blocks are used to store data. The data blocks used to store data are read to a deduplication store on the storage appliance. It is determined that a modification occurs to a data block in the local application server disk of the application server. The modification is read to the deduplication store. A remote virtual image of the application server can be generated from the deduplication store.

In another aspect, a method of disaster recovery on the storage appliance includes the step of installing a hypervisor on a storage appliance. After a backup operation but before a restore operation, an entire raw image of the application server is cached in the form of a virtual disk image. A virtual machine image is created from the virtual disk image of the entire raw image of the application server. A set of used raw image blocks is transferred such that the virtual machine disk is fully populated with data. A step includes mounting the virtual machine image of the application server to a virtual machine disk. Incremental backups of modifications are implemented to a set of used application server data blocs to the virtual machine image.

Optionally, a virtual machine can be created. The virtual machine can be connected to a computer network.

Figure 1:
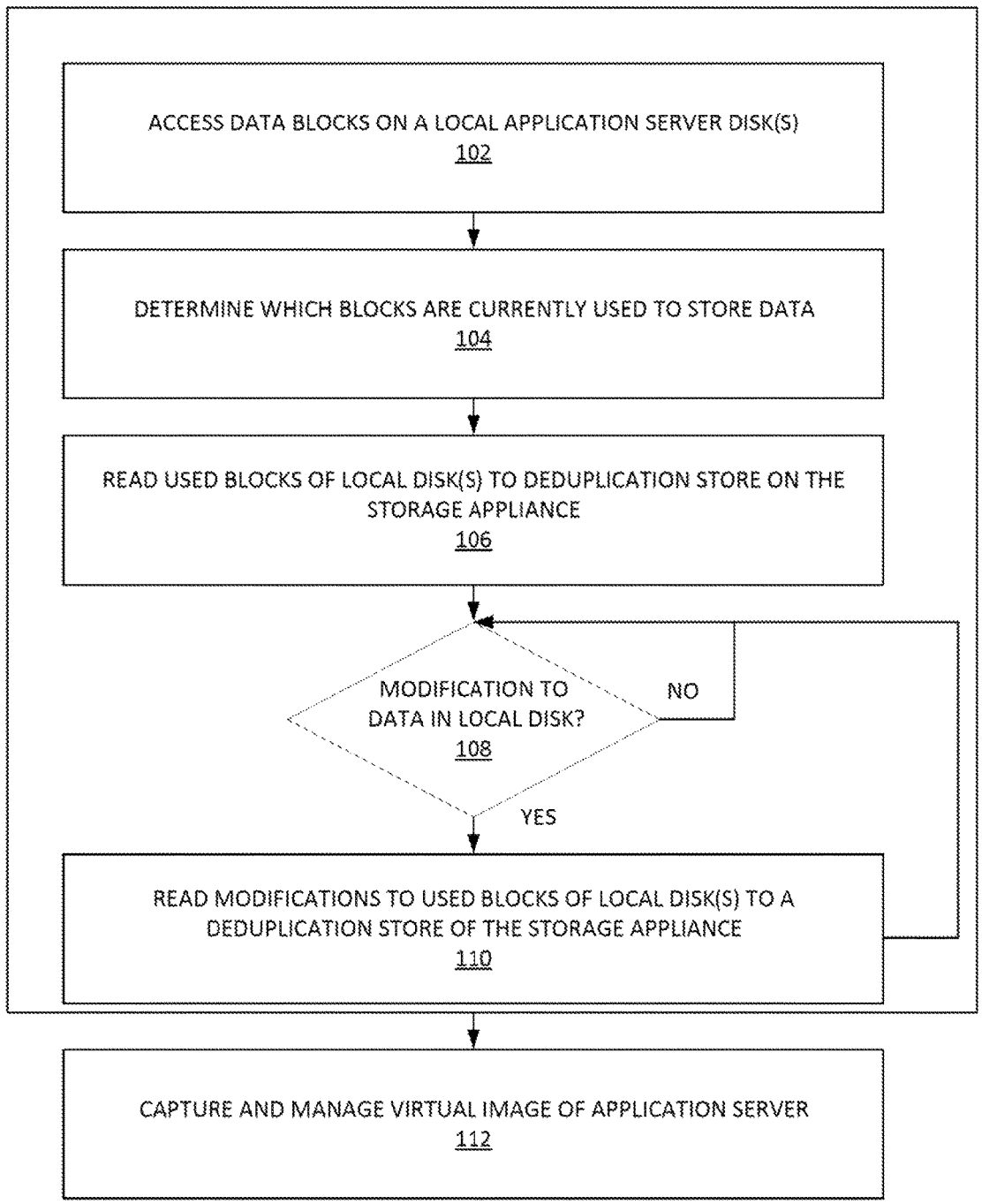
FIG. 1 a process of capturing and managing a virtual image of an application server, according to some embodiments.

The Figures described above are a representative set, and are not an exhaustive with respect to embodying the invention.

DESCRIPTION

Disclosed are a system, method, and article of manufacture of one click backup in a cloud-based disaster recovery system. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application server can be, inter alia, a software framework that provides a generalized approach to creating an application-server implementation, regard to what the application functions are and/or the server portion of a specific implementation instance. The server's function can be dedicated to the execution of procedures (e.g. programs, routines, scripts) for supporting its applied applications. An application server can be an example of a physical server or a virtual machine running on any hypervisor.

Azure® (Microsoft Azure) can be a cloud computing platform and infrastructure, created by Microsoft, for building, deploying and managing applications and/or services through a global network of datacenters. It provides both PaaS and IaaS services and for supports various different programming languages, tools and/or frameworks (e.g. Microsoft-specific and/or third-party software and systems).

A backup, or the process of backing up, can refer to the copying and/or archiving of computer data so it may be used to restore the original after a data loss event.

Chunk can be the segments of data that are generated from a data stream by splitting the data stream at fixed or variable lengths. A chunk can be a specified fixed size or variable size.

Cloud computing can be computing that can involve a large number of computers connected through a communication network such as the Internet. Cloud computing can be a form of distributed computing over a network, and can include the ability to run a program or application on many connected computers at the same time.

Cloud storage can be a model of networked enterprise storage where data is stored in virtualized pools of storage which are generally hosted by third parties. Hosting companies can operate large data centers, and users can have data hosted by leasing storage capacity from said hosting companies. Physically, the resource can span across multiple servers and multiple locations.

Continuous data protection (CDP) can be backup of computer data by automatically saving a copy of every change made to that data. It allows the user or administrator to restore data to any point in time.

Disk images (e.g. 'images') can be computer files containing the contents (or portions thereof) and structure of a disk volume and/or a data storage device.

Elasticity can be the degree to which a cloud-computing system is able to adapt to workload changes by provisioning and deprovisioning resources in an autonomic manner, such that at each point in time the available resources match the current demand as closely as possible.

Hypervisor can be a piece of computer software, firmware and/or hardware that creates and runs virtual machines.

Infrastructure as a service (IaaS) can be physical machines, virtual machines, and/or other resources offered with a cloud-service model.

Local area network (LAN) can be a computer network that interconnects computers within a limited area such as a home, school, computer laboratory, or office building using network media.

Mounting can be the process of making a file system accessible.

New Technology File System (NTFS) is a proprietary file system developed by Microsoft®.

Platform as a service (PaaS) can be a category of cloud computing services that provides a computing platform and a solution stack as a service.

Software application can be a group of software programs that execute the workflows related to backup and disaster recovery.

Virtual Hard Disk (VHD and/or VHDX) can be a file/disk image format used by Microsoft® Hyper V.

Virtual Disk Image" (VDI) can be a VirtualBox-specific container format for storing files (e.g. with a .vdi suffix) on the host operating system. Oracle VM VirtualBox can be a virtualization software package (e.g. for x86 and AMD64/Intel64-based computers from Oracle Corporation as part of its family of virtualization products).

Virtual Machine Disk (VMDK) can be a file/disk image format used by VMware®.

Virtual machine (VM) can be a software-based emulation of a computer. Virtual machines can operate based on the computer architecture and functions of a computer.

Exemplary Methods

One click backup (OCB) systems and/or methods can enable a user to back up an application server (e.g. a specified IP address). OCB can be a hybrid solution combining image backups and/or file system incrementals. This can resulting in a short backup-windows with bootable VMs.

FIG. 1 illustrates an example process 100 of capturing and managing a virtual image of an application server, according to some embodiments. In step 102 of process 100, data blocks (e.g. a sequence of bytes or bits containing some whole number of records, having a specified block size) in a local application server's disks can be accessed. Additionally, application server machine hardware details can also be captured (e.g. number of disks, boot sequence of disks, identification of different volumes on disks, etc.). This information can be saved as metadata. In step 104, it can be determined which data blocks are used to store data. In this way, empty data blocks may not be used. For example, if the disk is two (2) terra bytes (TB) of raw blocks, but the used space in the file system is just one-hundred (100) gigabytes (GB), then only the 100 GB is counted as used to store data. In step 106, data blocks of local disks can be read to a deduplication store on the storage appliance. All used data blocks can be read to the remote image in this way. In step 108, it can be determined if a modification to one or more data blocks in the disk(s) of the application server. If 'no', then process 100 can monitor the application server for said modifications. If 'yes', then process 100 can implement step 110. In step 110, modifications to used blocks (e.g. changed files) of local disks can be determined and read to deduplication store of storage appliance. This can be an incremental backup process. Steps 102-110 can be used to implement step 112. In step 112, a remote virtual image of an application server can be captured and/or managed.

Figure 2:
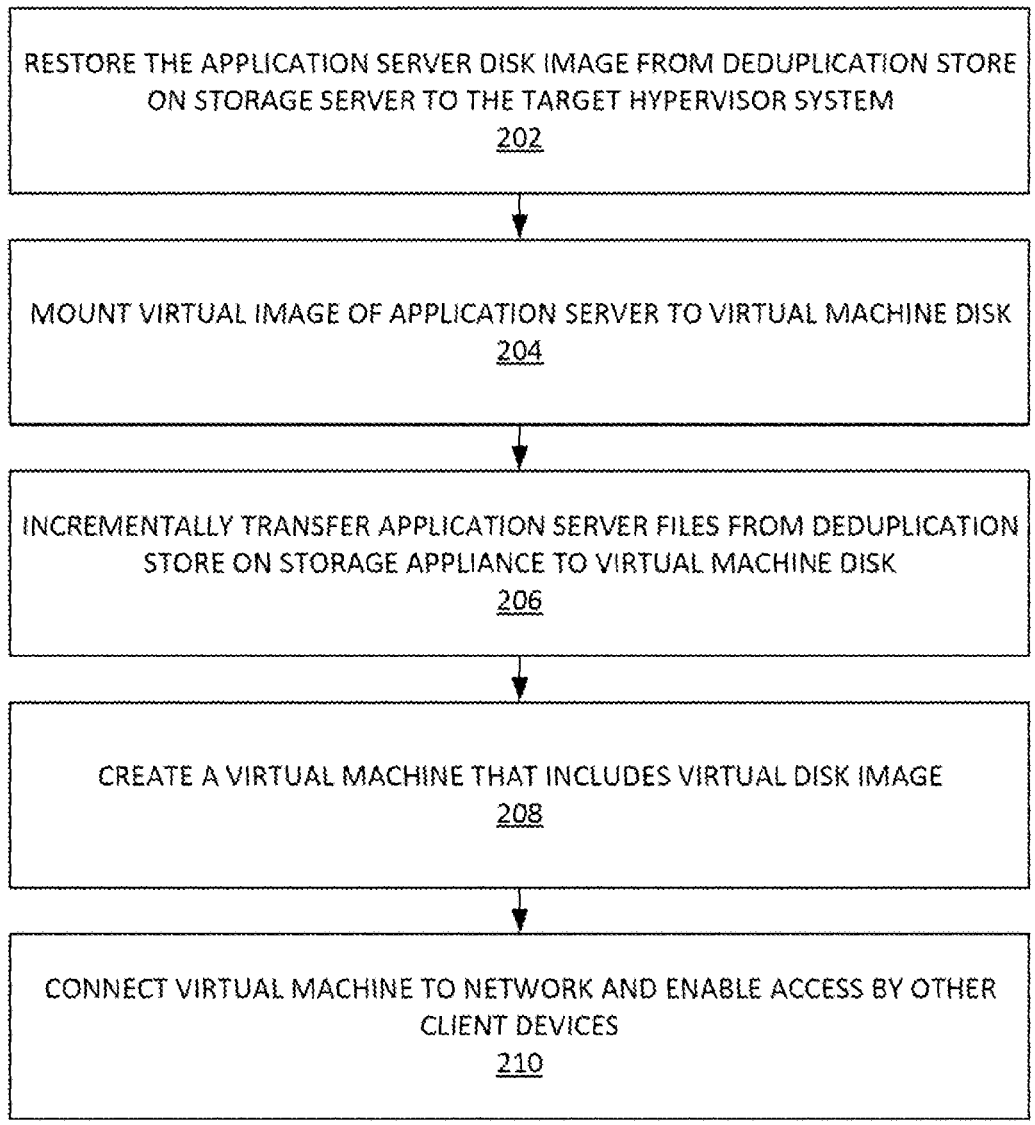
FIG. 2 illustrates an example process of recovery an application server in a target system (e.g. as a virtual machine accessible by other client devices), according to some embodiments.

FIG. 2 illustrates an example process 200 of recovery an application server in a target system (e.g. as a virtual machine accessible by other client devices), according to some embodiments. Process 200 can be used as the workflow to recover and create a VM from full/incremental disk images in the storage appliance. Process 200 can be used to transfer a raw image of the application server from a storage appliance to a target system. In some embodiments, the application server's metadata can be analyzed. The empty disks of the target system can be cleared using the application server's metadata. The storage structure of the application server can be implemented in volumes (e.g. a storage area with a corresponding filesystem, typically resident on a single partition of a hard disk). These disks and/or volumes can be in any virtual format (e.g. if target system platform is a Windows® system then choose VHD, if virtual box choose VDI, Virtual Machine Disk (VMDK), if target system platform is a Windows® system and application server disk size is greater than 2 terra bytes then choose VHDX, if VMware, choose Virtual Machine Disk (VMDK), etc.).

More specifically, in step 202 of process 200, the application server disk image can be restored from deduplication store on storage server to the target hypervisor system. Such disk images can correspond to a full image backup. Data deduplication can include a specialized data compression technique for eliminating duplicate copies of repeating data. In step 204, the virtual image of the application server can be mounted to a virtual machine disk. The file system can then be visible. These incremental files correspond to the incremental backup image. In step 206, incrementally transfer application server files to the virtual machine disk. In step 208, a virtual machine is created that includes the virtual disk image. The restore process can then be complete. In step 210, the virtual machine is connected to a network such that other client devices are able to access it. The format of the virtual machine can be based on the target hypervisor and/or the size of the disk. Process 200 can be used to reimage another system with the data of a specified application server.

Figure 3:
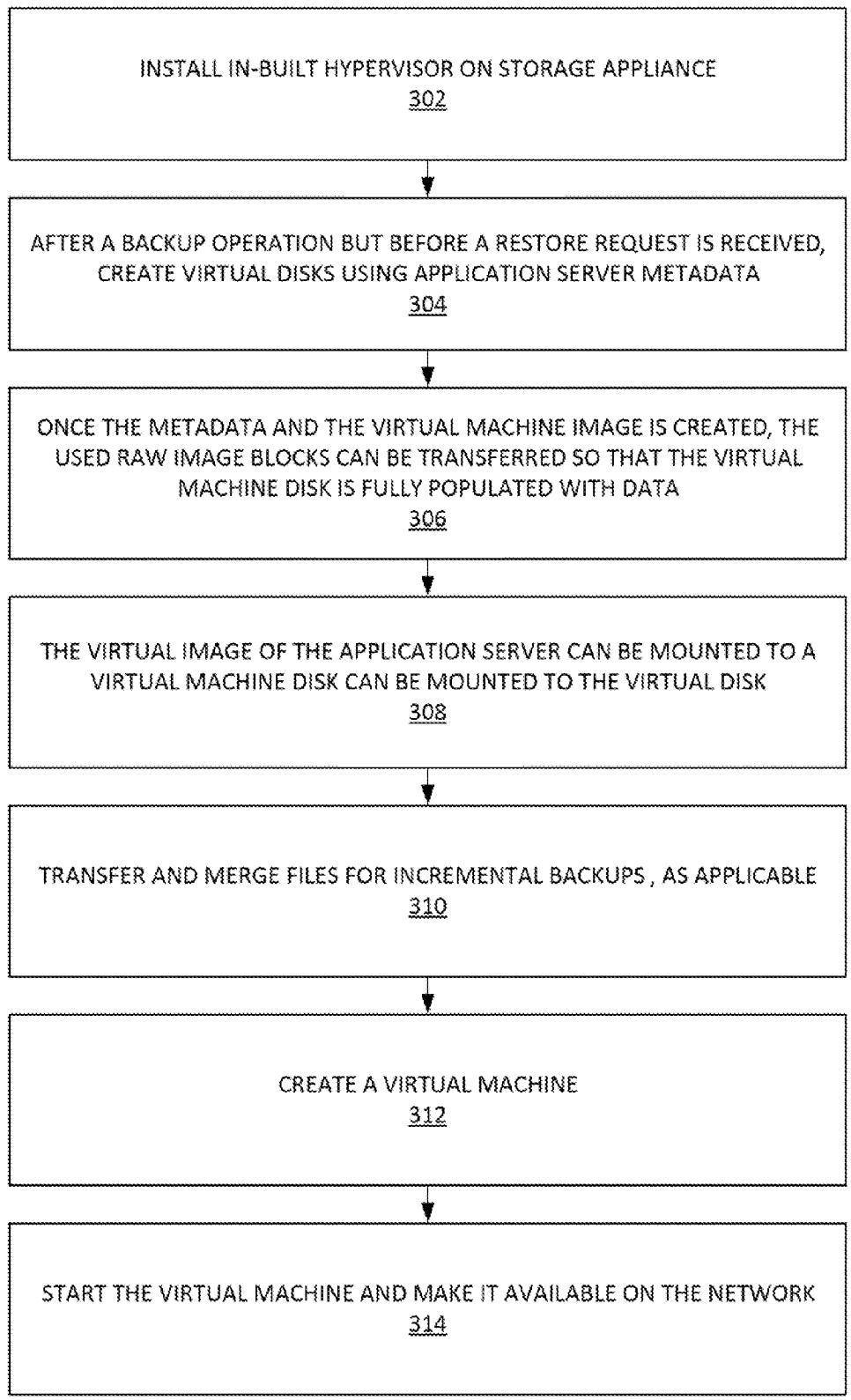
FIG. 3 illustrates an example process of disaster recovery on the storage appliance, according to some embodiments.

FIG. 3 illustrates an example process 300 of disaster recovery on the storage appliance, according to some embodiments. The storage appliance can be the system which has collected on the data and stored the file system on itself. In step 302, a hypervisor can be installed on the storage device. For example, the Appliance can be Linux based and have Kernel-based Virtual Machine (KVM) (e.g. virtualization solution which turns the Linux kernel into a hypervisor) or VirtualBox installed. In step 304, after a backup operation (e.g. process 100) but before a restore operation, the entire raw image of the application server can be cached in the form of virtual disk image(s). For example, for a Linux-based storage appliance, when the backup complete, the metadata of the application server disks can be used to create virtual machine disks in the VDI format. In step 306, once the metadata and the virtual machine image is created, the used raw image blocks can be transferred so that the virtual machine disk is fully populated with data. In step 308, the virtual image of the application server can be mounted to a virtual machine disk. Accordingly, the incremental files can be continuously added. In step 310, transfer and merge files for incremental backups, as applicable. In step 312, a virtual machine is created. In step 314, the VM is started and made available on the network.

In this way, a recent virtual image of the most recent backup of the application server is maintained in a cache of the storage appliance. In the event the application server becomes unavailable, this pre-cached virtual machine disk on the storage appliance can be used to immediately create a virtual machine. The virtual machine can be booted, connected with a network and accessed by other application servers.

Exemplary Systems

Figure 4:
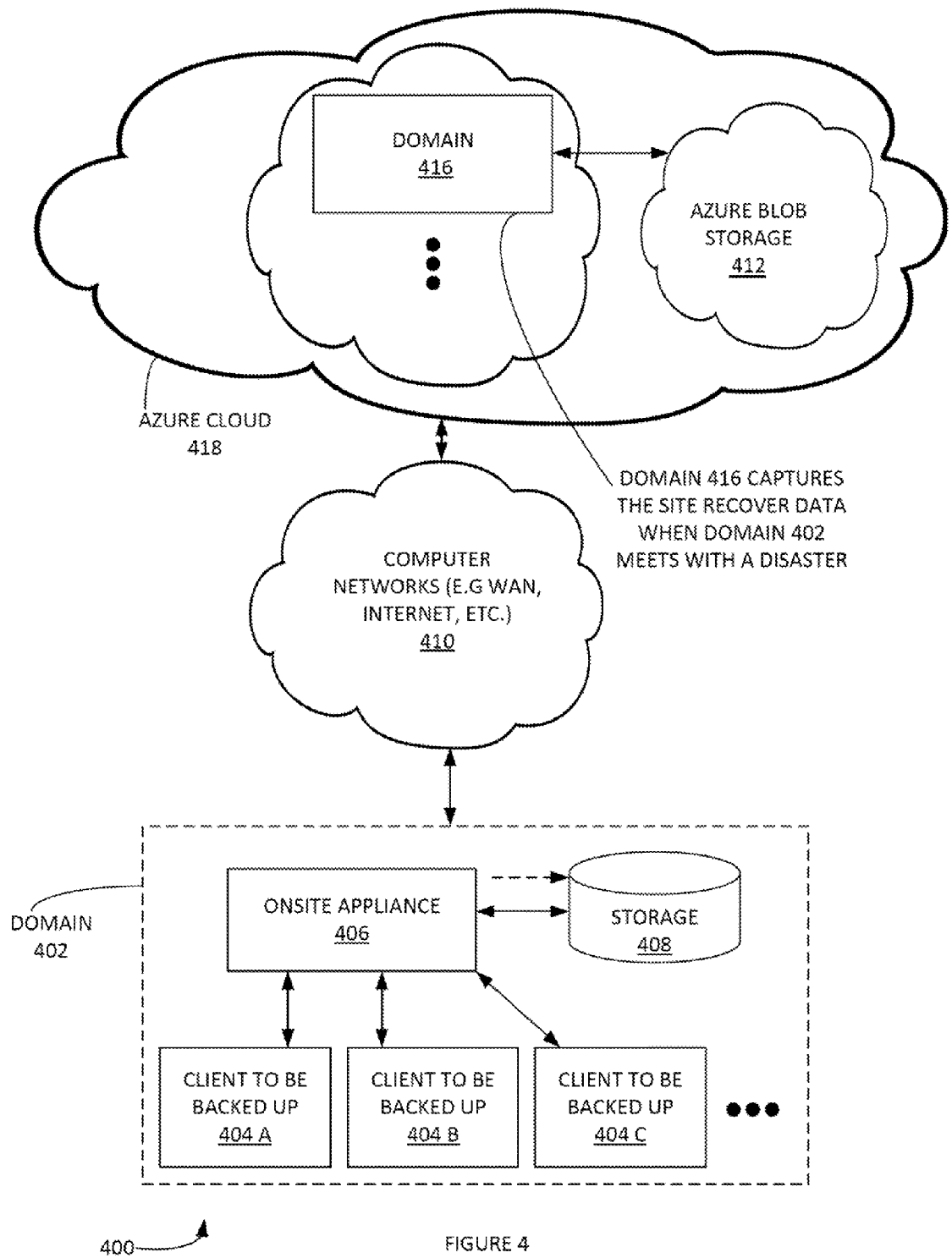
FIG. 4 illustrates an example system of Microsoft Azure® blob storage, according to some embodiments.

FIG. 4 illustrates another example system 400 of cloud-based data and/or application recovery with an NTFS system, according to some embodiments. System 400 can include domain 402. For example, domain 402 can be a Windows® domain (e.g. a group of Windows-based computers). Domain 402 can include a set of physical servers and/or their applications, such as clients to be backed up 404 A-C. On-site appliance 406 can include pre-installed software that is plugged-in into the LAN of domain 402. On-site appliance 406 can be configured to work with a user selected cloud vendor. On-site appliance 406 can discover the physical servers and applications clients 404 A-C. On-site appliance 406 can capture the metadata and/or data of these applications on either a scheduled periodic basis and/or demand based as invoked by the user. On-site appliance 406 can analyze this metadata and/or data using a pluggable deduplication engine. The unique data blocks can then be uploaded to elastic storage on cloud (e.g. Azure® blob storage 412) via computer networks 410. The unique data blocks can be stored as unique de-duplicated chunks (not shown) in a storage vault of Azure® blob storage 412 with domain 416. Domain 416 is a copy of domain 402. Domain 416 can represent the recovered site domain 402. Domain 416 can capture the site recover use case applicable when domain 402 meets with a disaster. Azure cloud 418 can also include domain 416 and azure blob storage 412. Domain 416 can be used to implement processes 100, 200 and/or 300, in some embodiments.

It is noted that although the present example of systems are implemented in an Azure® cloud computing platform, other examples can be modified for other cloud computing platforms. According the present examples of FIG. 4 is provided by way of example and not of limitation.

Figure 5:
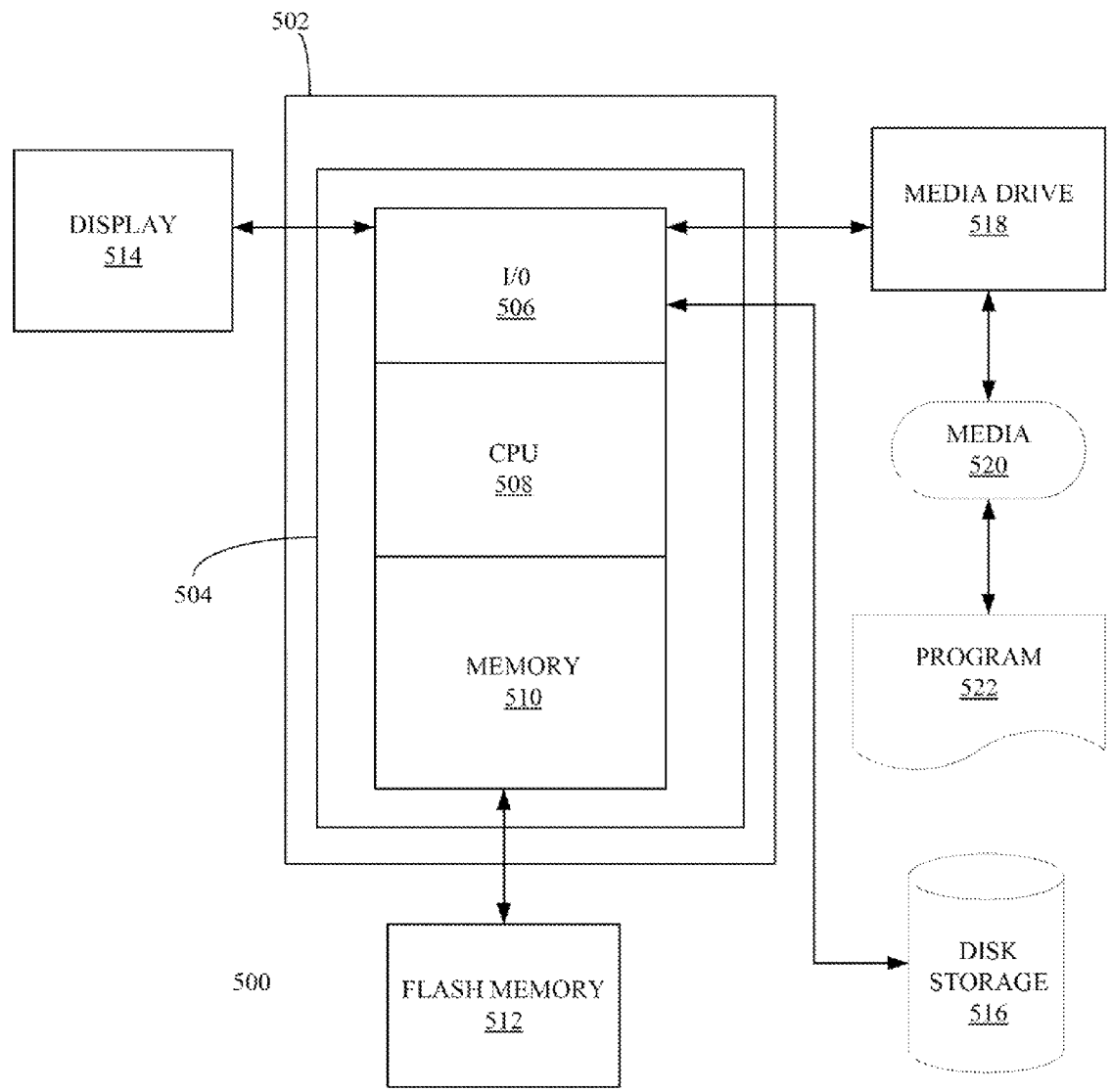
FIG. 5 depicts computing system with a number of components that may be used to perform any of the processes described herein.

FIG. 5 depicts an exemplary computing system 500 that can be configured to perform any one of the processes provided herein. In this context, computing system 500 may include, for example, a processor, memory, storage, and I/O devices (e.g., monitor, keyboard, disk drive, Internet connection, etc.). However, computing system 500 may include circuitry or other specialized hardware for carrying out some or all aspects of the processes. In some operational settings, computing system 500 may be configured as a system that includes one or more units, each of which is configured to carry out some aspects of the processes either in software, hardware, or some combination thereof.

FIG. 5 depicts computing system 500 with a number of components that may be used to perform any of the processes described herein. The main system 502 includes a motherboard 504 having an I/O section 506, one or more central processing units (CPU) 508, and a memory section 510, which may have a flash memory card 512 related to it. The I/O section 506 can be connected to a display 514, a keyboard and/or other user input (not shown), a disk storage unit 516, and a media drive unit 518. The media drive unit 518 can read/write a computer-readable medium 520, which can contain programs 522 and/or data. Computing system 500 can include a web browser. Moreover, it is noted that computing system 500 can be configured to include additional systems in order to fulfill various functionalities. Computing system 500 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computer-implemented method comprising:
accessing a set of data blocks in a local application server disk in an application server, wherein the set of data blocks are included in a file system;
determining which of the set of data blocks are used to store data;
reading the determined used data blocks to store data to a deduplication store on a storage appliance, wherein the deduplication store comprises a data compression technique for eliminating one or more duplicate copies of a repeating data;
determining that a modification occurs to the file system data blocks in the local application server disk of the application server;
reading the modification to store in the deduplication store;
generating a virtual disk image in a specified virtual disk format that is different from a source virtual disk format of the application server from the deduplication store, wherein the virtual disk image corresponds to a full image backup of the local application server disk, and wherein the data compression technique is implemented to eliminate unallocated data blocks in the virtual disk image;
capturing the application server machine hardware details;
saving the application server machine hardware details as metadata;
restoring the virtual disk image of the application server from the deduplication store on the storage appliance to a target hypervisor system, wherein a remote virtual image of the application server is mounted to the virtual disk image, and wherein a file system of the remote virtual image is visible;
incrementally transferring a set of files of the application server files to the remote virtual image; and
creating a virtual machine that includes the virtual disk image.

2. The method of claim 1 further comprising:
connecting the virtual machine to a computer network such that a set of client devices is able to access the virtual machine.

3. A computerized system comprising:
a hardware processor configured to execute instructions;
a memory containing instructions when executed on the hardware processor, causes the hardware processor to perform operations that:
access a set of data blocks in a local application server disk in an application server, wherein the set of data blocks are included in a file system;
determine which of the set of data blocks are used to store data;
read the determined used data blocks to store data to a deduplication store on a storage appliance, wherein the deduplication store comprises a data compression technique for eliminating one or more duplicate copies of a repeating data;
determine that a modification occurs to the file system data blocks in the local application server disk of the application server;
read the modification to store in the deduplication store;
generate a virtual disk image in a specified virtual disk format that is different from a source virtual disk format of the application server from the deduplication store, wherein the virtual disk image corresponds to a full image backup of the local application server disk, and wherein the data compression technique is implemented to eliminate unallocated data blocks in the virtual disk image;
capture the application server machine hardware details;
save the application server machine hardware details as metadata;
restore the virtual disk image of the application server from the deduplication store on the storage appliance to a target hypervisor system, wherein a remote virtual image of the application server is mounted to the virtual disk image, and wherein a file system of the remote virtual image is visible;
incrementally transfer a set of files of the application server files to the remote virtual image; and
create a virtual machine that includes the virtual disk image.

4. The computerized system of claim 3, wherein the memory containing instructions when executed on the hardware processor, causes the hardware processor to perform operations that:
connect the virtual machine to a computer network such that a set of client devices is able to access the virtual machine.

* * * * *